(12) United States Patent
Su et al.

(10) Patent No.: US 12,400,472 B2
(45) Date of Patent: Aug. 26, 2025

(54) DETECTION SYSTEM AND DETECTION METHOD

(71) Applicant: REALTEK SEMICONDUCTOR CORP., Hsinchu (TW)

(72) Inventors: Kai-Chun Su, Hsinchu (TW); Min-Xuan Qiu, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 338 days.

(21) Appl. No.: 18/138,259

(22) Filed: Apr. 24, 2023

(65) Prior Publication Data

US 2024/0242536 A1 Jul. 18, 2024

(30) Foreign Application Priority Data

Jan. 18, 2023 (TW) ................................. 112102471

(51) Int. Cl.
*G06V 40/16* (2022.01)
*G06V 10/82* (2022.01)

(52) U.S. Cl.
CPC ............ *G06V 40/165* (2022.01); *G06V 10/82* (2022.01)

(58) Field of Classification Search
CPC .... G06V 40/165; G06V 10/82; G06V 40/171; G06V 10/764; G06V 40/172; G06V 10/454; G06V 40/103; G06V 40/161; G06V 40/174; G06V 40/166; G06V 40/168; G06V 10/25; G06V 10/751; G06V 10/7715; G06V 40/18; G06V 40/20; G06T 2207/30201; G06T 2207/20084; G06T 2207/20081; G06T 7/73; G06T 2207/30196; G06T 11/60; G06T 7/11; G06T 7/74;

(Continued)

(56) References Cited

U.S. PATENT DOCUMENTS 11,036,967 B2 * 6/2021 Zheng .................. G06V 40/166
11,244,449 B2 * 2/2022 Su ........................ G06V 40/171

(Continued)

OTHER PUBLICATIONS

Deng et al., "RetinaFace: Single-stage Dense Face Localisation in the Wild", May 4, 2019, pp. 1-10.

(Continued)

*Primary Examiner* — Michael S Osinski
(74) *Attorney, Agent, or Firm* — Birch, Stewart, Kolasch & Birch, LLP

(57) ABSTRACT

A detection system and a detection method are provided. The detection method includes: obtaining first, second and third keypoints of a face by a keypoint acquisition module based on an image containing the face, the keypoint acquisition module obtaining the third keypoint based on a predetermined position on a midline of a human face and the first and the second keypoints based on two paired positions outside the midline; obtaining a vector by a first calculation module based on the first and second keypoints; obtaining a two-variable linear function by a second calculation module based on the vector and the third keypoint; and substituting, by a determination module, the coordinates of the first keypoint and the coordinates of the second keypoint into the two-variable linear function to obtain first and second values, respectively, and determining the state of the face based on the first and second values.

14 Claims, 8 Drawing Sheets

(58) Field of Classification Search
CPC ......... G06T 7/0012; G06T 7/10; G06N 3/045; G06N 3/08; G06N 3/084; G06N 3/04
See application file for complete search history.

(56) References Cited

U.S. PATENT DOCUMENTS

| | | | | |
|---|---|---|---|---|
| 11,256,956 | B2* | 2/2022 | Mahbub | G06V 10/764 |
| 11,741,728 | B2* | 8/2023 | Tang | G06V 10/764 |
| | | | | 382/104 |
| 12,112,569 | B2* | 10/2024 | Mahbub | G06V 10/764 |
| 12,174,883 | B1* | 12/2024 | Ji | G06F 16/583 |
| 12,223,566 | B2* | 2/2025 | Kang | G06T 7/194 |
| 2009/0225099 | A1* | 9/2009 | Yuasa | G06T 7/344 |
| | | | | 382/154 |
| 2018/0211096 | A1* | 7/2018 | Cao | G06V 40/171 |
| 2018/0225842 | A1* | 8/2018 | Wang | G06T 7/73 |
| 2018/0300537 | A1* | 10/2018 | Qian | G06V 10/754 |
| 2019/0043216 | A1* | 2/2019 | Yabuuchi | G06V 10/82 |
| 2019/0172223 | A1* | 6/2019 | Vajda | G06N 3/084 |
| 2019/0278983 | A1* | 9/2019 | Iqbal | G06N 3/084 |
| 2019/0279010 | A1* | 9/2019 | Xie | G06V 40/103 |
| 2019/0294860 | A1* | 9/2019 | Jin | G06V 40/172 |
| 2020/0272888 | A1* | 8/2020 | Wang | G06V 40/103 |
| 2020/0327647 | A1* | 10/2020 | Su | G06T 5/77 |
| 2021/0097101 | A1* | 4/2021 | Hu | G06V 40/103 |
| 2021/0133427 | A1* | 5/2021 | Omori | G06T 3/40 |
| 2021/0209851 | A1* | 7/2021 | Xu | G06T 7/74 |
| 2021/0334516 | A1* | 10/2021 | Mahbub | G06V 10/454 |
| 2022/0101556 | A1* | 3/2022 | Zhang | G06N 3/08 |
| 2022/0292878 | A1* | 9/2022 | Wang | G06V 40/165 |
| 2022/0301304 | A1* | 9/2022 | Hampali | G06T 7/73 |
| 2022/0309833 | A1* | 9/2022 | Ohno | G06T 7/136 |
| 2023/0024829 | A1* | 1/2023 | Peng | H04N 23/611 |
| 2023/0196825 | A1* | 6/2023 | Guo | G06V 10/449 |
| | | | | 382/118 |
| 2023/0281863 | A1* | 9/2023 | Valentin | G06T 17/00 |
| 2024/0012477 | A1* | 1/2024 | Thieberger | A61B 5/1455 |
| 2024/0046655 | A1* | 2/2024 | Tang | G06V 10/751 |
| 2024/0112330 | A1* | 4/2024 | Xia | G06V 40/193 |
| 2025/0057415 | A1* | 2/2025 | Tian | A61B 3/00 |

OTHER PUBLICATIONS

Qi et al., "YOL05Face: Why Reinventing a Face Detector", Jan. 27, 2022, LinkSprite Technologies, USA, weijun.tan@linksprite.com, pp. 1-10.

Redmon et al., "YOLOv3: An Incremental Improvement", Apr. 8, 2018, pp. 1-6.

* cited by examiner

Subtract by the first calculation module the coordinates of the first keypoint from the coordinates of the second keypoint to obtain the above vector —S901

FIG. 9

Set a first component of the above vector as a coefficient of a first variable of an intermediate two-variable linear equation, and set a second component of the above vector as a coefficient of a second variable of the intermediate two-variable linear equation —S1001

Substitute a first coordinate and a second coordinate of the third keypoint into the intermediate two-variable linear equation to obtain a constant term of the intermediate two-variable linear equation —S1002

Set the first component of the above vector as a coefficient of a first variable of the two-variable linear function, set the second component of the above vector as a coefficient of a second variable of the two-variable linear function, and set the constant term of the intermediate two-variable linear equation as a constant term of the two-variable linear function —S1003

FIG. 10

DETECTION SYSTEM AND DETECTION METHOD

CROSS-REFERENCE TO RELATED APPLICATION

This non-provisional application claims priority under 35 U.S.C. § 119(a) to Patent Application No. 112102471 filed in Taiwan, R.O.C. on Jan. 18, 2023, the entire contents of which are hereby incorporated by reference.

BACKGROUND

Technical Field

The present disclosure relates to the field of image identification, and particularly relates to a technology for determining a state of a human face in an image by applying keypoints on the human face in the image.

Related Art

Traditionally, the pupil distance of human eyes in a human face is a common index for front face evaluation, but this index does not take into account the distance problem in human face detection. The pupil distance of the distant front face may be the same as that of the close side face, so it is still unable to correctly select a front face sample for human face identification.

SUMMARY

In view of this, some embodiments of the present disclosure provide a training system, a training method and an identification system, aiming at solving existing technical problems.

Some embodiments of the present disclosure provide a detection system. The detection system includes a keypoint acquisition module, a first calculation module, a second calculation module and a determination module; the keypoint acquisition module is configured to receive an image containing a face and obtain a first keypoint, a second keypoint and a third keypoint of the above face based on the above image, where the keypoint acquisition module obtains the third keypoint based on a predetermined position on a midline of a human face and the first keypoint and the second keypoint based on two paired positions outside the midline of the human face; the first calculation module is configured to obtain a vector based on the first keypoint and the second keypoint; the second calculation module is configured to obtain a two-variable linear function based on the above vector and the third keypoint; and the determination module is configured to substitute coordinates of the first keypoint and coordinates of the second keypoint into the above two-variable linear function to obtain first and second values, respectively, and determine the state of the face based on the first and second values.

Some embodiments of the present disclosure provide a detection method applicable to the detection system including a keypoint acquisition module, a first calculation module, a second calculation module and a determination module; the detection method includes the following steps: receiving an image containing a face by the keypoint acquisition module, and obtaining a first keypoint, a second keypoint and a third keypoint of the face based on the above image, where the keypoint acquisition module obtains the third keypoint based on a predetermined position on a midline of a human face and the first keypoint and the second keypoint based on two paired positions outside the midline of the human face; obtaining a vector by the first calculation module based on the first keypoint and the second keypoint; obtaining a two-variable linear function by the second calculation module based on the above vector and the third keypoint; and substituting, by the determination module, the coordinates of the first keypoint and the coordinates of the second keypoint into the two-variable linear function to obtain first and second values, respectively, and determining the state of the face based on the first and second values.

Based on the above detection system and detection method provided by some embodiments of the present disclosure, the state of the face in the image can be quickly determined by performing simple algebraic operation and determination on the detected first keypoint, second keypoint and third keypoint of the face.

BRIEF DESCRIPTION OF THE DRAWINGS

FIG. 4-1 is a predetermined position and human face corresponding schematic diagram drawn according to some embodiments of the present disclosure.

FIG. 4-2 is a predetermined position and human face corresponding schematic diagram drawn according to some embodiments of the present disclosure.

FIG. 9 is a detection method flowchart drawn according to some embodiments of the present disclosure.

FIG. 10 is a detection method flowchart drawn according to some embodiments of the present disclosure.

DETAILED DESCRIPTION

Figure 1:
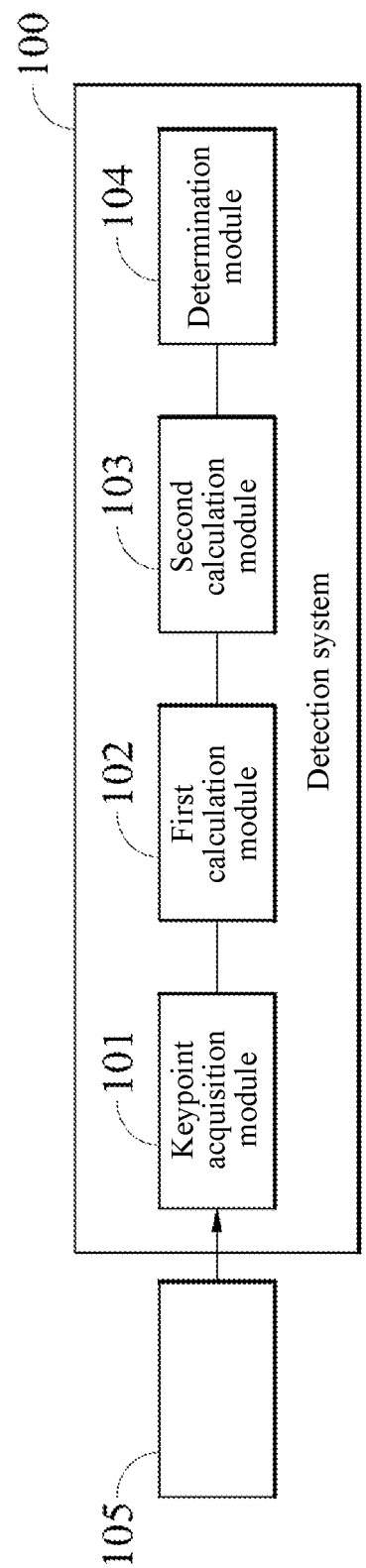
FIG. 1 is a detection system block diagram drawn according to some embodiments of the present disclosure.

The above and other technical contents, features and functions of the present disclosure will be clearly presented in the following detailed description of the embodiments in conjunction with the accompanying drawings. The thickness or size of each element in the figures is expressed in an exaggerated, omitted or approximate way for those familiar with the art to understand and read, and the size of each element is not entirely its actual size, and is not used to limit the implementation of the present disclosure, so it has no technical significance, and any modification of structure, change of proportion or adjustment of size, without affecting the efficacy and purpose of the present disclosure, it shall still fall within the scope of the technical content disclosed in the present disclosure. The same reference numerals in all diagrams will be used to represent the same or similar elements. The term "connection" mentioned in the following embodiments can refer to any direct or indirect, wired or wireless connection means. In this article, the "first" or "second" and other similar ordinal words described are used to distinguish or refer to the same or similar elements or structures, and do not necessarily imply the order of these elements in the system. It is to be understood that in some cases or configurations, ordinal words can be used interchangeably without affecting the implementation of the present disclosure.

Figure 2:
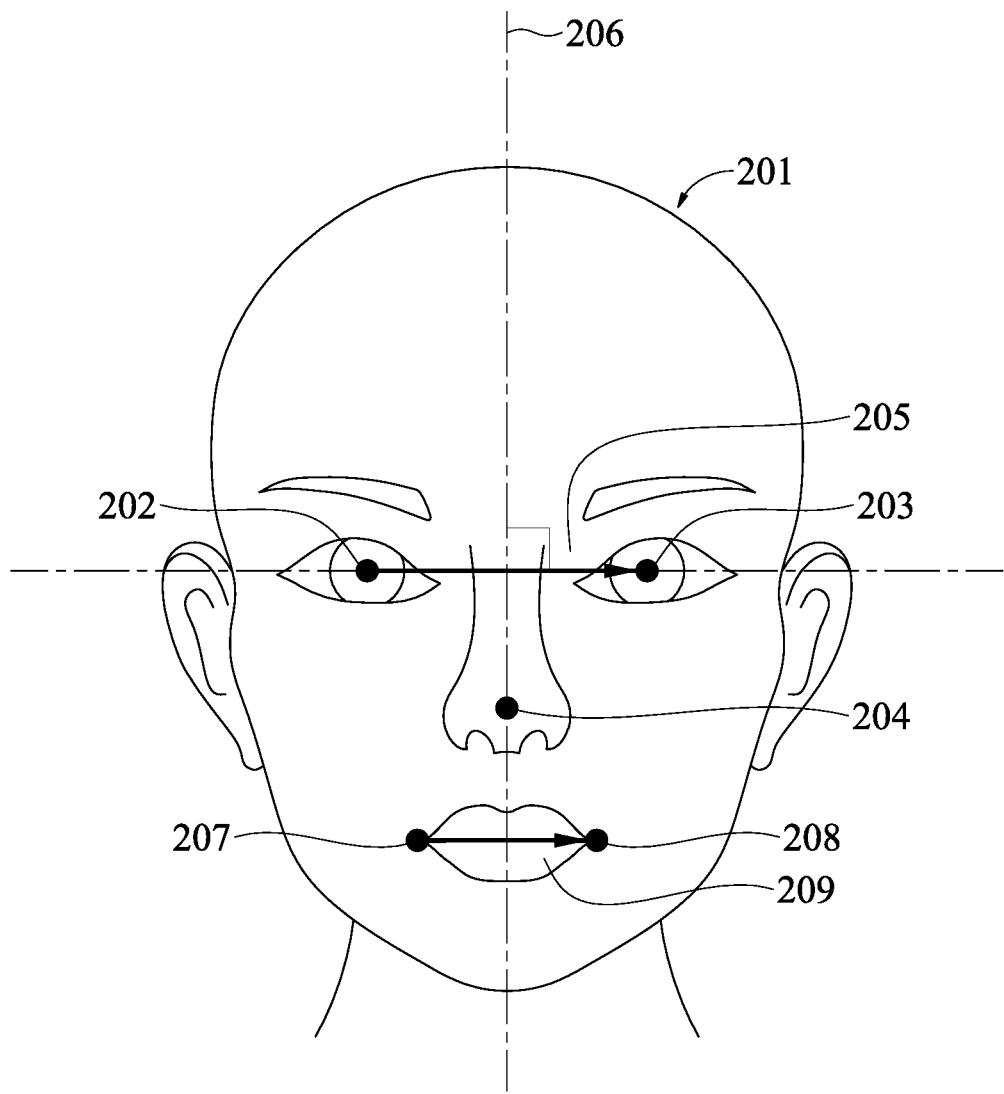
FIG. 2 is a human face and keypoint schematic diagram drawn according to some embodiments of the present disclosure.
Figure 3:
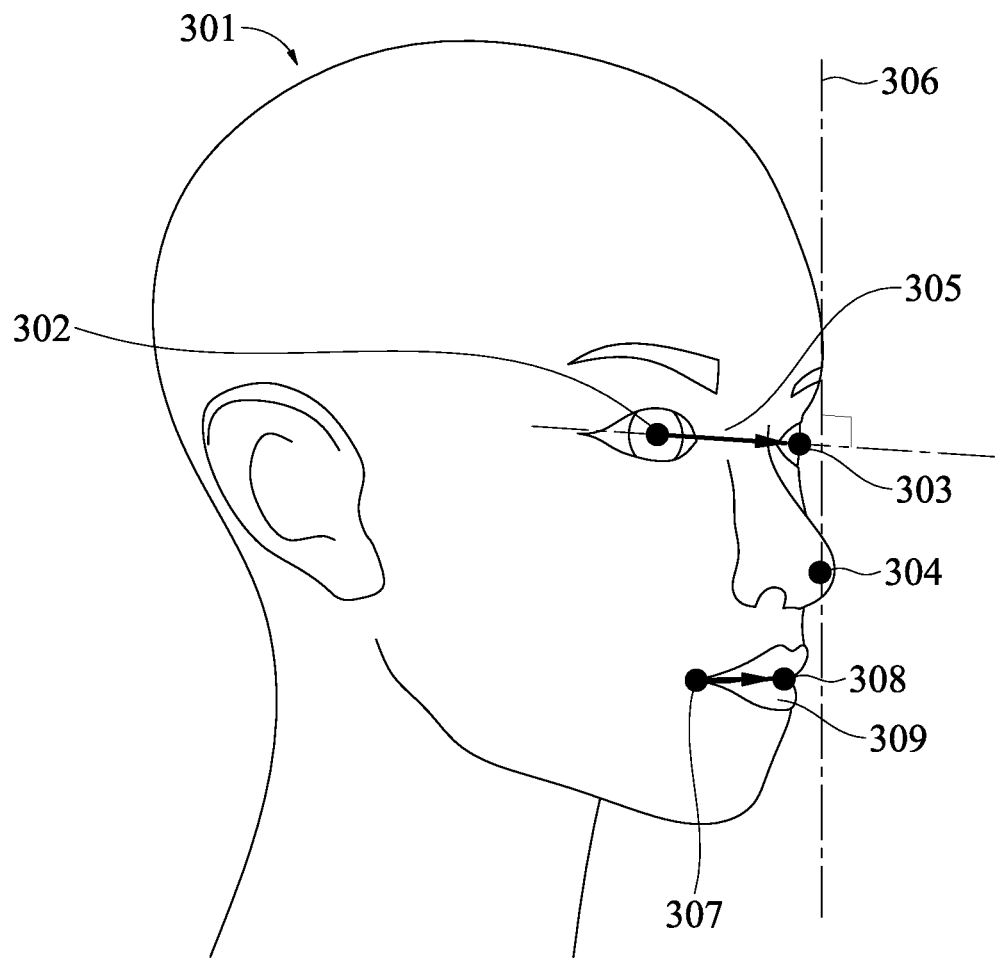
FIG. 3 is a human face and keypoint schematic diagram drawn according to some embodiments of the present disclosure.

FIG. 1 is a detection system block diagram drawn according to some embodiments of the present disclosure. FIG. 2 is a human face and keypoint schematic diagram drawn according to some embodiments of the present disclosure. FIG. 3 is a human face and keypoint schematic diagram drawn according to some embodiments of the present disclosure. Referring to FIG. 1-FIG. 3 together, a detection system 100 includes a keypoint acquisition module 101, a first calculation module 102, a second calculation module 103 and a determination module 104.

The keypoint acquisition module 101 is configured to receive an image 105 containing a face, and the image 105 is an image 201 or an image 301. The keypoint acquisition module 101 is configured to obtain a first keypoint, a second keypoint and a third keypoint of the face based on a plurality of predetermined positions and the above received image 105 containing the face. The keypoint acquisition module 101 obtains the third keypoint based on the predetermined position on a midline of a human face and the first keypoint and the second keypoint based on two predetermined positions paired outside the midline of the human face.

In some embodiments of the present disclosure, the above plurality of predetermined positions include positions of the nose and two eyes, the position of the nose is on the midline of the human face, and the positions of the two eyes are paired outside the midline of the human face. As shown in the embodiment drawn in FIG. 2, the keypoint acquisition module 101 obtains a first keypoint 202 and a second keypoint 203 of the image 201 corresponding to the positions of the two eyes and a third keypoint 204 corresponding to the position of the nose based on the predetermined positions of the nose and the two eyes. The aforementioned action of obtaining the first keypoint 202 and the second keypoint 203 of the image 201 corresponding to the positions of the two eyes and the third keypoint 204 corresponding to the position of the nose indicates obtaining the coordinates of each of the first keypoint 202, the second keypoint 203 and the third keypoint 204. The third keypoint 204 corresponding to the position of the nose is on a midline 206 of the human face. As shown in the embodiment drawn in FIG. 3, the above plurality of predetermined positions include positions of the nose and the two eyes. The keypoint acquisition module 101 obtains a first keypoint 302 and a second keypoint 303 of the image 301 corresponding to the positions of the two eyes and a third keypoint 304 corresponding to the position of the nose based on the positions of the nose and the eyes. The aforementioned action of obtaining the first keypoint 302 and the second keypoint 303 of the image 301 corresponding to the positions of the two eyes and the third keypoint 304 corresponding to the position of the nose indicates obtaining the coordinates of each of the first keypoint 302, the second keypoint 303 and the third keypoint 304. The third keypoint 304 corresponding to the position of the nose is on a midline 306 of the human face.

In some embodiments of the present disclosure, the above plurality of predetermined positions include the positions of the nose, the left corner of the mouth and the right corner of the mouth, the position of the nose is on the midline of the human face, and the positions of the left corner of the mouth and the right corner of the mouth are paired outside the midline of the human face. As shown in the embodiment drawn in FIG. 2, the keypoint acquisition module 101 obtains a first keypoint 207 and a second keypoint 208 of the image 201 corresponding to the left corner of the mouth and the right corner of the mouth, and a third keypoint 204 corresponding to the position of the nose based on the predetermined positions of the nose, the left corner of the mouth and the right corner of the mouth. As shown in the embodiment drawn in FIG. 3, the above plurality of predetermined positions include the positions of the nose, the left corner of the mouth and the right corner of the mouth. The keypoint acquisition module 101 obtains a first keypoint 307 and a second keypoint 308 of the image 301 corresponding to the left corner of the mouth and the right corner of the mouth, and a third keypoint 304 corresponding to the position of the nose based on the positions of the nose, the left corner of the mouth and the right corner of the mouth.

Figure 5:
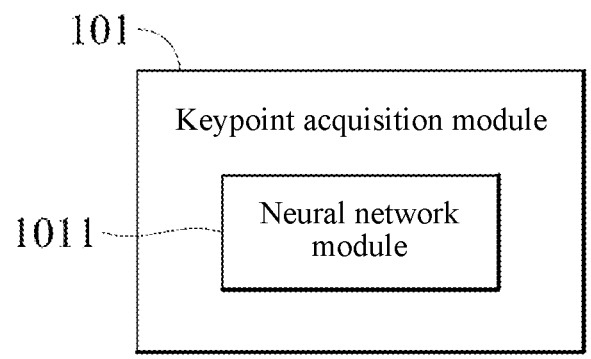
FIG. 5 is a keypoint acquisition module block diagram drawn according to some embodiments of the present disclosure.

FIG. 5 is a keypoint acquisition module block diagram drawn according to some embodiments of the present disclosure. Referring to FIG. 5, in the embodiment drawn in FIG. 5, the keypoint acquisition module 101 includes a trained neural network module 1011. The trained neural network module 1011 is configured to receive the above image 105 containing the face and output the coordinates of each of the first keypoint, the second keypoint and the third keypoint of the face so as to enable the keypoint acquisition module 101 to obtain the first keypoint, the second keypoint and the third keypoint.

In some embodiments of the present disclosure, the above neural network module 1011 includes a trained multi-task cascaded convolutional networks, and the trained multi-task cascaded convolutional networks can output keypoint coordinates corresponding to the positions of the nose, the left corner of the mouth, the right corner of the mouth and the two eyes on the image 105 of the face after receiving the image 105 containing the face. Then the keypoint acquisition module 101 obtains the first keypoint, the second keypoint and the third keypoint from the output of the multi-task cascaded convolutional networks based on the plurality of predetermined positions.

Figures 1, 4:
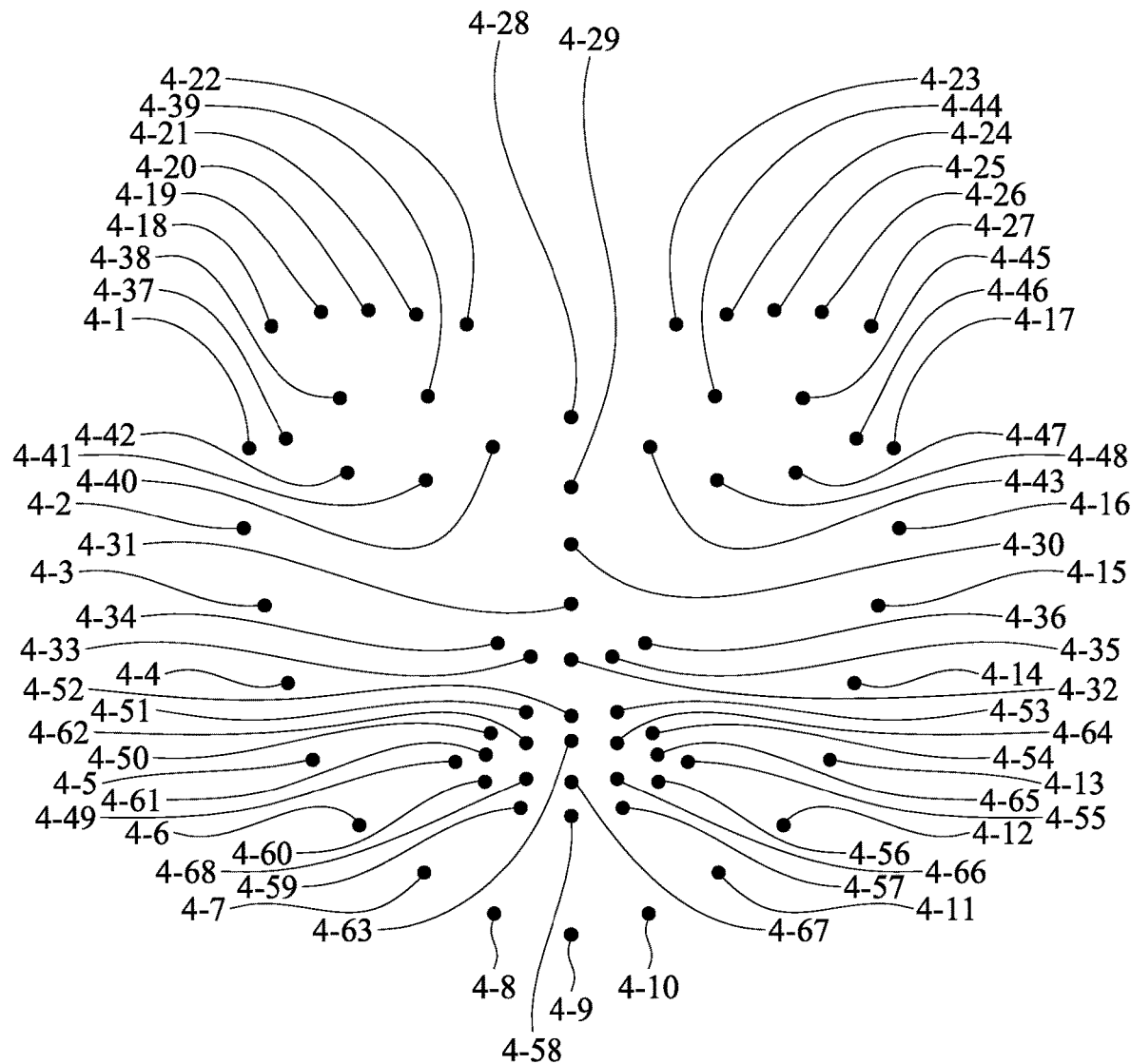
Figures 2, 4:
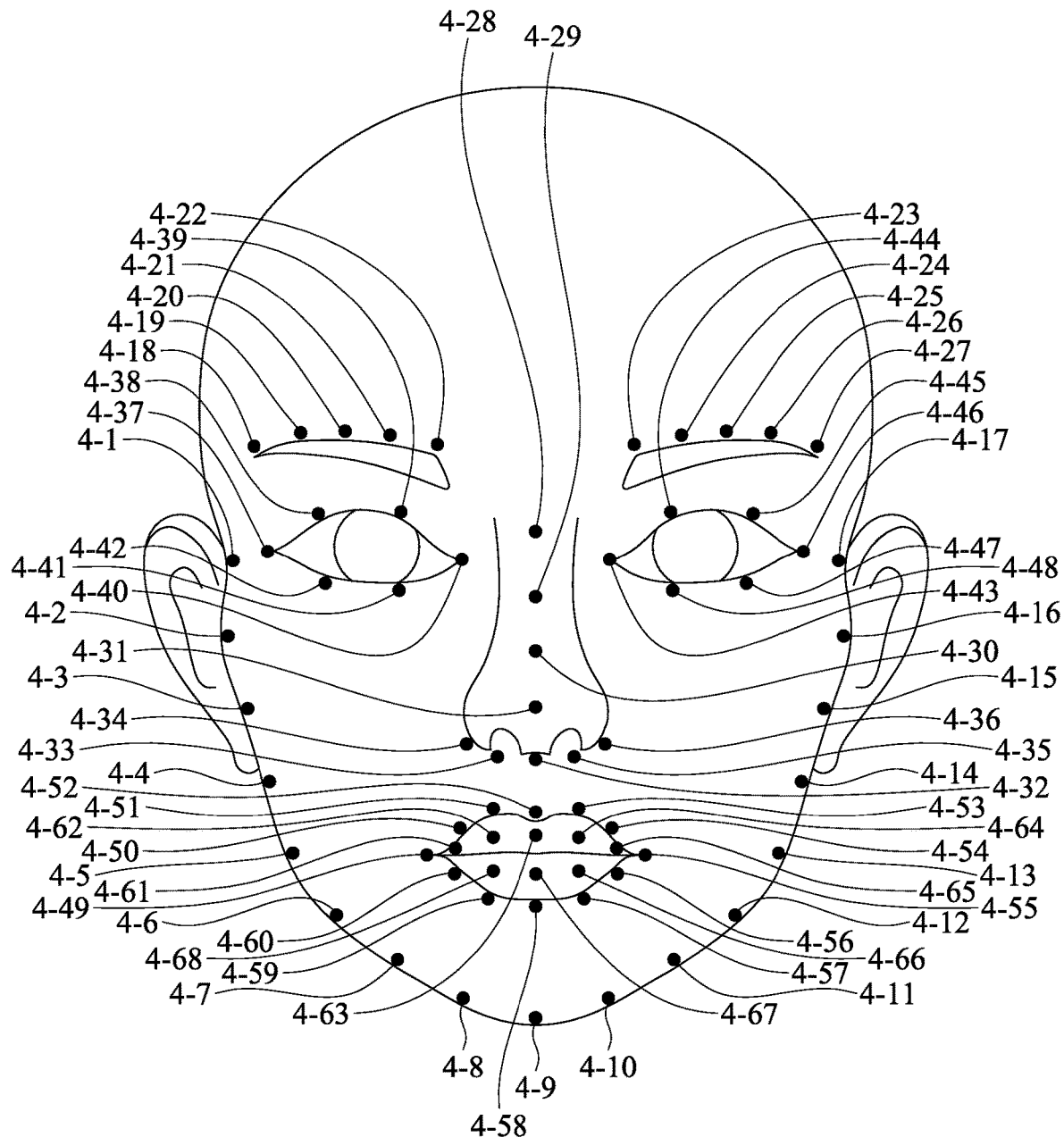

FIG. 4-1 is a predetermined position and human face corresponding schematic diagram drawn according to some embodiments of the present disclosure. FIG. 4-2 is a predetermined position and human face corresponding schematic diagram drawn according to some embodiments of the present disclosure. In some embodiments of the present disclosure, the above plurality of predetermined positions are selected from a predetermined position 4-1 to a predetermined position 4-68. As shown in FIG. 4-2, a predetermined position 4-9, a predetermined position 4-28 to a predetermined position 4-31, a predetermined position 4-34, a predetermined position 4-52, a predetermined position 4-58, a predetermined position 4-63 and a predetermined position 4-67 are on the midline of the human face. The predetermined position 4-1 to a predetermined position 4-8, a predetermined position 4-10 to a predetermined position 4-27, a predetermined position 4-32 to a predetermined position 4-33, a predetermined positions 4-35 to a predetermined position 4-51, a predetermined position 4-53 to a predetermined position 4-57, a predetermined position 4-59 to a predetermined position 4-62, a predetermined position 4-64 to a predetermined position 4-66 and a predetermined position 4-68 drawn in FIG. 4-1 and FIG. 4-2, are paired at symmetrical positions on the human face. In some embodiments of the present disclosure, the third keypoint is selected from one of the above predetermined position 4-9, predetermined position 4-28 to predetermined position 4-31, predetermined position 4-34, predetermined position 4-52, predetermined position 4-58, predetermined position 4-63 and predetermined position 4-67, e.g. the predetermined position 4-28. The first keypoint and the second keypoint are selected from the paired predetermined positions in the predetermined position 4-1 to predetermined position 4-8, the predetermined position 4-10 to predetermined position 4-27, the predetermined position 4-32 to predetermined position 4-33, the predetermined position 4-35 to predetermined position 4-51, the predetermined position 4-53 to predetermined position 4-57, the predetermined position 4-59 to predetermined position 4-62, the predetermined position 4-64 to predetermined position 4-66 and the predetermined position 4-68, e.g. a predetermined position 4-3 and a predetermined position 4-15.

In some embodiments of the present disclosure, the keypoint acquisition module 101 uses the FacemarkLBF classin OpenCV to obtain keypoint coordinates on the human face of the image 105 corresponding to the above predetermined positions 4-1 to predetermined positions 4-68, and then the keypoint acquisition module 101 selects coordinates corresponding to the above predetermined positions from the obtained keypoint coordinates corresponding to the above predetermined positions 4-1 to predetermined positions 4-68 based on the plurality of predetermined positions so as to obtain the first keypoint, the second keypoint and the third keypoint. It is to be noted that the keypoint acquisition module 101 also uses modules of other image processing software to obtain the keypoint coordinates on the face of the image 105 corresponding to the above predetermined positions 4-1 to predetermined positions 4-68. The present disclosure is not limited by the above FacemarkLBF class in OpenCV.

The detection method according to the embodiments of the present invention and how modules of the detection system 100 cooperate to operate are described below in detail with reference to the drawings.

Figure 7:
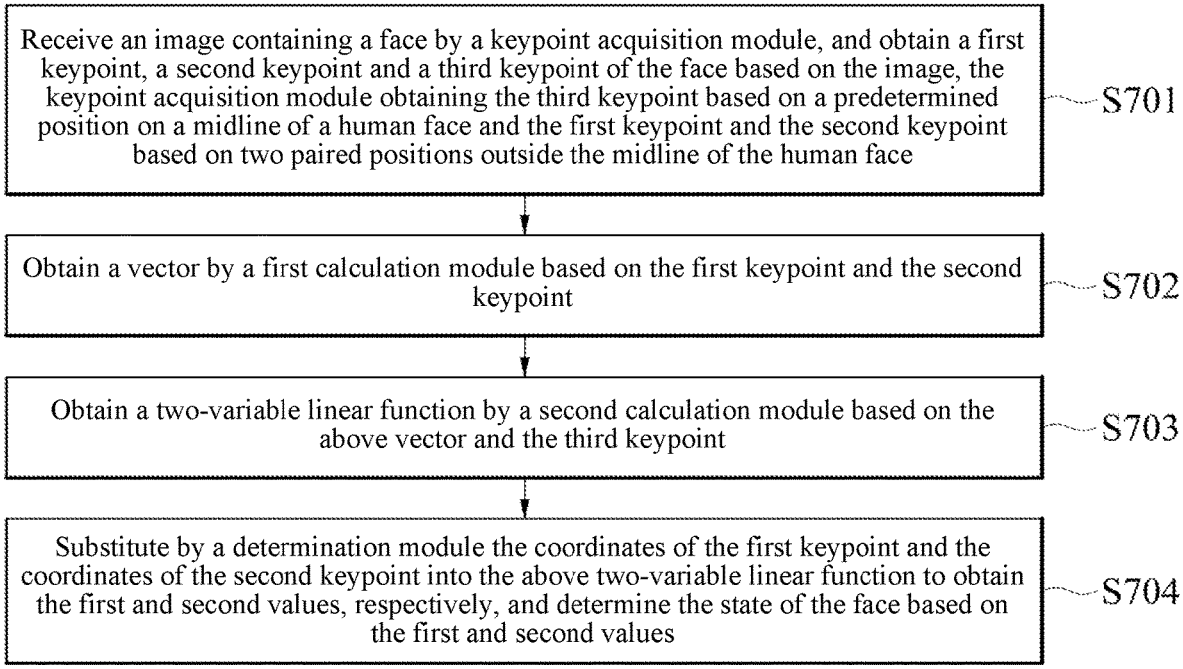
FIG. 7 is a detection method flowchart drawn according to some embodiments of the present disclosure.

FIG. 7 is a detection method flowchart drawn according to some embodiments of the present disclosure. Referring to FIGS. 1-3 and FIG. 7 together, in the embodiment drawn in FIG. 7, the detection method includes steps S701-S704. In step S701, the image 105 containing the face is received by the keypoint acquisition module 101. Then, the first keypoint, the second keypoint and the third keypoint of the above face are obtained based on the image 105 by the keypoint acquisition module 101, the third keypoint (e.g. the third keypoint 204 or the third keypoint 304) is obtained by the keypoint acquisition module 101 based on the predetermined position (e.g. the position of the nose drawn in FIG. 2) on the midline of the human face, and the first keypoint (e.g. the first keypoint 202 or the first keypoint 302) and the second keypoint (e.g. the second keypoint 203 corresponding to the first keypoint 202 or the second keypoint 303 corresponding to the first keypoint 302) are obtained based on two positions (e.g. positions of two eyes drawn in FIG. 2) paired outside the midline of the human face.

In the step S702, a vector is obtained by the first calculation module 102 based on the first keypoint and the second keypoint. For example, a vector 205 is obtained by the first calculation module 102 based on the first keypoint 202 and the second keypoint 203. For example, a vector 209 is obtained by the first calculation module 102 based on the first keypoint 207 and the second keypoint 208. For example, a vector 305 is obtained by the first calculation module 102 based on the first keypoint 302 and the second keypoint 303. For example, a vector 309 is obtained by the first calculation module 102 based on the first keypoint 307 and the second keypoint 308.

In the step S703, the two-variable linear function is obtained by the second calculation module 103 based on the above vector and the third keypoint. In the step S704, the coordinates of the first keypoint and the coordinates of the second keypoint are substituted into the above two-variable linear function by the determination module 104 to obtain first and second values respectively. The state of the face in the image 105 is determined by the determination module 104 based on the above first and second values. In some embodiments of the present disclosure, the state of the above face includes a front face state and a side face state.

Figure 8:
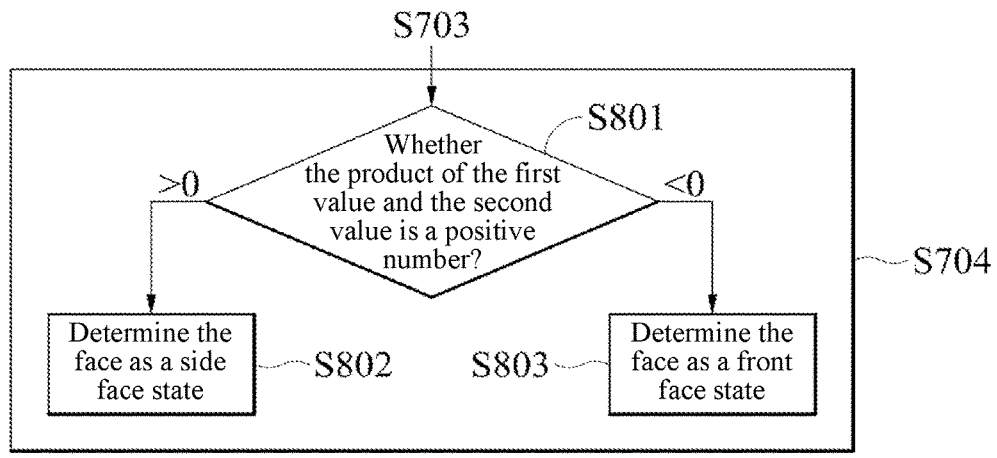
FIG. 8 is a detection method flowchart drawn according to some embodiments of the present disclosure.

FIG. 8 is a detection method flowchart drawn according to some embodiments of the present disclosure. Referring to FIG. 1, FIG. 7 and FIG. 8 together, in the embodiment drawn in FIG. 8, the above step S704 includes steps S801 to S803. In the step S801, whether the product of the first and second values is a positive number is determined by the determination module 104. If the product of the first and second values is a positive number, the step S802 is carried out, and if the product of the first and second value is a negative number, the step S803 is carried out. In the step S802, the face is determined as the side face state by the determination module 104 responding to the product of the first and second values as a positive number. In the step S803, the face is determined as the front face state by the determination module 104 responding to the product of the first and second values as a negative number.

The first keypoint 202 and the second keypoint 203 corresponding to the positions of two eyes in the image 201 and the third keypoint 204 corresponding to the position of the nose in FIG. 2, and the first keypoint 302 and the second keypoint 303 corresponding to the positions of the two eyes in the image 301 and the third keypoint 304 corresponding to the position of the nose in FIG. 3 are treated as examples for illustrating, the coordinates of the first keypoint 202 are (54,56), the coordinates of the second keypoint 203 are (74,56), the coordinates of the third keypoint 204 are (64, 64), the coordinates of the first keypoint 302 are (73,51), the coordinates of the second keypoint 303 are (88,55), and the coordinates of the third keypoint 304 are (91,68); the above coordinates are pixel coordinates of the image 105, namely the coordinates of the vertex of an upper left corner of the image 105 are (0,0); a first coordinate component of the coordinates refers to a position counted from left to right by taking the vertex of the upper left corner of the image 105 as a reference; and a second coordinate component of the coordinates refers to a position counted from top to bottom by taking the vertex of the upper left corner of the image 105 as a reference. It is to be noted that since the method of this invention does not produce different results due to the choice of different coordinate systems, so that the present disclosure is not limited by the above pixel coordinates.

FIG. 9 is a detection method flowchart drawn according to some embodiments of the present disclosure. Referring to FIGS. 1-3 and FIG. 9 together, in the embodiment drawn in FIG. 9, the above step S702 includes a step S901. In the step S901, the coordinates of the first keypoint are subtracted from the second keypoint to obtain the above vector by the first calculation module 102. By taking the above examples for illustrating as an example, the coordinates (54,56) of the first keypoint 202 are subtracted from the coordinates (74, 56) of the second keypoint 203 to obtain a vector 205 (20,0)

by the first calculation module 102. The coordinates (73,51) of the first keypoint 302 are subtracted from coordinates (88,55) of the second keypoint 303 to obtain a vector 305 (15,4) by the first calculation module 102.

FIG. 10 is a detection method flowchart drawn according to some embodiments of the present disclosure. Referring to FIGS. 1-3, FIGS. 1-8 and FIG. 10 together, in the embodiment drawn in FIG. 10, the above step S703 includes steps S1001-S1003. In the step S1001, the first component of the above vector is set as a coefficient of a first variable of an intermediate two-variable linear equation by the second calculation module 103, and a second component of the above vector is set as a coefficient of a second variable of the above intermediate two-variable linear equation.

In the step S1002, the first coordinates and the second coordinates of the third keypoint are substituted into the above intermediate two-variable linear equation to obtain a constant term of the intermediate two-variable linear equation by the second calculation module 103. In the step S1003, the first component of the above vector is set as a coefficient of the first variable of the two-variable linear function, the second component of the above vector is set as a coefficient of the second variable of the above two-variable linear function, and the constant term of the above intermediate two-variable linear equation is set as a constant term of the above two-variable linear function.

The first keypoint 202 (the coordinates are (54,56)) and the second keypoint 203 (the coordinates are (74,56)) corresponding to the positions of two eyes in the above image 201 in FIG. 2, the third keypoint 204 (the coordinates are (64,64)) corresponding to the position of the nose and the vector 205 (the value is (20,0)) are illustrated as follows.

In the step 1001, the first component of the vector 205 is substituted into the coefficient $\alpha_1$ of the first variable x of the following intermediate two-variable linear equation (1) by the second calculation module 103, the second component 0 of the vector 205 is substituted into the coefficient $\beta_1$ of the second variable y of the following intermediate two-variable linear equation (1), $$\alpha_1 x + \beta_1 y + \gamma_1 = 0, \quad (1)$$

so as to obtain an equation $20x+\gamma_1=0$. In the step 1002, a first coordinate component 64 and a second coordinate component 64 of the third keypoint 204 are substituted into the first variable x and the second variable y of the above intermediate two-variable linear equation by the second calculation module 103, so as to obtain a value of the constant term $\gamma_1$ of the intermediate two-variable linear equation to be −1280. In the step S1003, the first component of the vector 205 is substituted into the coefficient $\alpha_2$ of the first variable x of the following two-variable linear function (2), the second component of the vector 205 is substituted into the coefficient $\beta_2$ of the second variable y of the following two-variable linear function (2), and the constant term $\gamma_1=-1280$ of the above intermediate two-variable linear function is substituted into the constant term $\gamma_2$ in the following two-variable linear function (2), $$\alpha_2 x + \beta_2 y + \gamma_2, \quad (2)$$

so as to obtain a two-variable linear function 20x−1280.

It is to be noted that the coordinates (54,56) of the first keypoint 202 are substituted into the first variable x and the second variable y of the two-variable linear function 20x−1280 respectively to obtain a first value of −200 by the determination module 104, and the coordinates (74,56) of the second keypoint 203 are substituted into the first variable x and the second variable y of the two-variable linear function 20x−1280 to obtain a second value of 200. The face in the image 201 is determined as the front face state by the determination module 104 responding to the product of the first value −200 and the second value 200 as a negative number.

The first keypoint 302 (the coordinates are (73,51)) and the second keypoint 303 (the coordinates are (88,55)) corresponding to the positions of two eyes in the above image 301 in FIG. 3, the third keypoint 304 (the coordinates are (91,68)) corresponding to the position of the nose and the vector 305 (the value is (15,4)) are taken as an example for illustrating.

In the step S1001, the first component 15 of the vector 305 is substituted by the second calculation module 103 into the coefficient $\alpha_1$ of the first variable x of the above intermediate two-variable linear equation (1) and the second component 4 of the vector 305 is substituted into the coefficient $\beta_1$ of the second variable y of the above intermediate two-variable linear equation (1) to obtain an equation $15x+4y+\gamma_1=0$. In the step S1002, a first coordinate component 91 and a second coordinate component 68 of the third keypoint 304 are respectively substituted by the second calculation module 103 into the first variable x and the second variable y of the above intermediate two-variable linear equation respectively to obtain the constant term $\gamma_1$ of the intermediate two-variable linear equation to be −1637. In the step 1003, the first component of the vector 305 is substituted into the coefficient $\alpha_2$ of the first variable x of the above two-variable linear function (2), the second component of the vector 305 is substituted into the coefficient $\beta_2$ of the second variable y of the above two-variable linear function (2), and the constant term $\gamma_1=-1637$ of the above intermediate two-variable linear equation is substituted into the constant term $\gamma_2$ of the above two-variable linear function (2) to obtain the two-variable linear function 15x+4y−1637.

It is to be noted that the coordinates (73,51) of the first keypoint 302 are respectively substituted by the determination module 104 into the first variable x and the second variable y of the two-variable linear function 15x+4y−1637 obtain a first value of −338, and the coordinates (88,55) of the second keypoint 303 are substituted into the two-variable linear function 15x+4y−1637 to obtain a second value of −97. The face in the image 301 is determined as the side face state by the determination module 104 responding to the product of the first value −338 and the second value −97 as a positive number.

Figure 6:
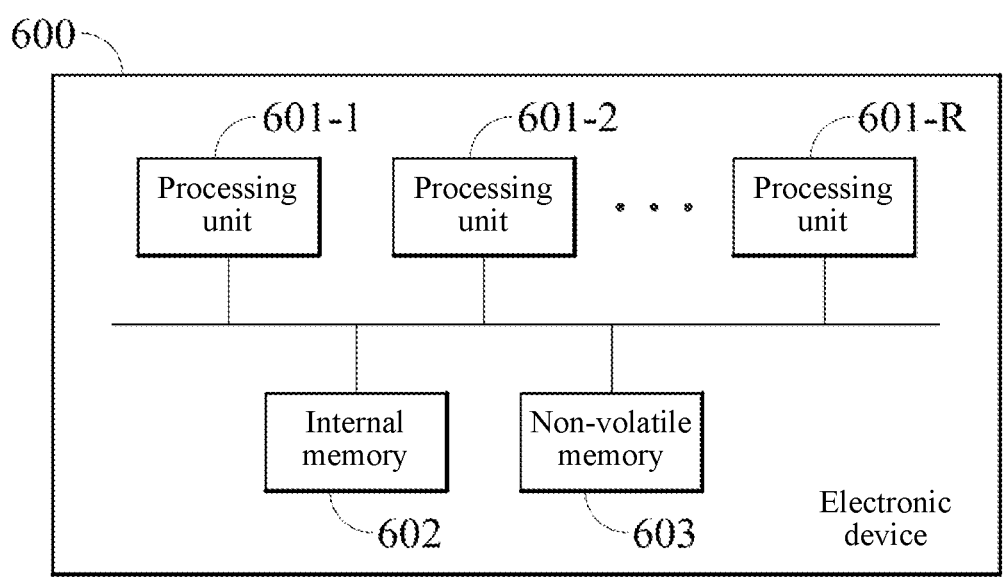
FIG. 6 is a structure schematic diagram of an electronic device drawn according to some embodiments of the present disclosure.

FIG. 6 is a structure schematic diagram of an electronic device drawn according to some embodiments of the present disclosure. As shown in FIG. 6, on a hardware level, the electronic device 600 includes processors 601-1, 601-2 to 601-R, an internal memory 602 and a non-volatile memory 603, and R is a positive integer. The internal memory 602 is a random-access memory (RAM) for example. The non-volatile memory 603 is at least 1 disc memory and the like for example. Certainly, the electronic device 600 may further include hardware required by other functions.

The internal memory 602 and the non-volatile memory 603 are configured to store programs, the programs can include program codes, and the program codes include computer operation instructions. The internal memory 602 and the non-volatile memory 603 provide instructions and data for the processors 601-1 to 601-R. The processors 601-1 to 601-R read corresponding computer programs from the non-volatile memory 603 into the internal memory 602 and then run the programs, the detection system 100 is formed on a logic level, and the processors 601-1 to 601-R are specifically configured to execute steps recorded in FIGS. 7-10. Certainly, the modules of the detection system 100 can also be made in a hardware mode, and the present disclosure does not limit it.

The processors 601-1 to 601-R may be integrated circuit chips and have signal processing capability. During implementation, the methods and steps disclosed in the above embodiments can be completed through hardware integrated logic circuits or software instructions in the processors 601-1 to 601-R. The processors 601-1 to 601-R can be universal processors and include a central processing unit (CPU), a tensor processing unit, a digital signal processor (DSP), an application specific integrated circuit (ASIC), a field-programmable gate array (FPGA) or other programmable logic apparatuses. The processors can implement or perform the methods and the steps disclosed in the foregoing embodiments.

In some embodiments of the present disclosure, a computer readable storage medium is also provided. The computer readable storage medium stores at least one instruction. When the at least one instruction is executed by the processors 601-1 to 601-R of the electronic device 600, the processors 601-1 to 601-R of the electronic device 600 can execute the methods and steps disclosed in the above embodiments.

Examples of the computer storage medium include, but are not limited to, phase change RAM (PRAM), static random access memories (SRAM), dynamic random access memories (DRAM), other types of random access memories (RAM), read-only memories (ROM), electrically erasable programmable read-only memories (EEPROM), flash memories or other internal memory technologies, compact disc read-only memories (CD-ROM), digital versatile discs (DVD) or other optical memories, magnetic tape cassettes, magnetic tape disc memories or other magnetic storage devices or any other non-transmission media, and can be configured to store information which can be accessed by computing devices. According to the definition here, the computer readable medium does not include transitory media, such as modulated data signals and carriers.

Based on the above detection system and the detection method provided by some embodiments of the present disclosure, the state of the face can be quickly determined by performing simple algebraic operation and determination on the first keypoint, the second keypoint and the third keypoint of the detected face.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A detection system, comprising:
 a keypoint acquisition module, configured to receive an image containing a face and obtain a first keypoint, a second keypoint and a third keypoint of the face based on the image, the keypoint acquisition module obtaining the third keypoint based on a predetermined position on a midline of a human face and the first keypoint and the second keypoint based on two predetermined positions paired outside the midline of the human face;
 a first calculation module, configured to obtain a vector based on the first keypoint and the second keypoint;
 a second calculation module, configured to obtain a two-variable linear function based on the vector and the third keypoint; and
 a determination module, configured to substitute coordinates of the first keypoint and coordinates of the second keypoint into the two-variable linear function to obtain first and second values, respectively, and determine the state of the face based on the first and second values.

2. The detection system according to claim 1, wherein the determination module is configured to determine the face as a side face state by responding to the product of the first and second values as a positive number, and determine the face as a front face state by responding to the product of the first and second values as a negative number.

3. The detection system according to claim 1, wherein the first calculation module is configured to subtract the coordinates of the first keypoint from the coordinates of the second keypoint to obtain the vector.

4. The detection system according to claim 1, wherein the second calculation module executes the following steps to obtain the two-variable linear function: setting a first component of the vector as a coefficient of a first variable of an intermediate two-variable linear equation, and setting a second component of the vector as a coefficient of a second variable of the intermediate two-variable linear equation; substituting a first coordinate component and a second coordinate component of the third keypoint into the intermediate two-variable linear equation to obtain a constant term of the intermediate two-variable linear equation; and setting the first component of the vector as a coefficient of a first variable of the two-variable linear function, setting the second component of the vector as a coefficient of a second variable of the two-variable linear function, and setting the constant term of the intermediate two-variable linear equation as a constant term of the two-variable linear function.

5. The detection system according to claim 1, wherein the predetermined position on the midline of the human face is the position of the nose.

6. The detection system according to claim 1, wherein the two predetermined positions paired outside the midline of the human face are the positions of the eyes.

7. The detection system according to claim 1, wherein the keypoint acquisition module comprises a neural network module, and the neural network module is configured to receive the image of the face and output the coordinates of the first keypoint, the coordinates of the second keypoint and the coordinates of the third keypoint.

8. A detection method applicable to a detection system comprising a keypoint acquisition module, a first calculation module, a second calculation module and a determination module, comprising the following steps:
 (a) receiving an image containing a face by the keypoint acquisition module, and obtaining a first keypoint, a second keypoint and a third keypoint of the face based on the image, wherein the keypoint acquisition module obtains the third keypoint based on a predetermined position on a midline of a human face and the first keypoint and the second keypoint based on two predetermined positions paired outside the midline of the human face;

(b) obtaining a vector by the first calculation module based on the first keypoint and the second keypoint;

(c) obtaining a two-variable linear function by the second calculation module based on the vector and the third keypoint; and (d) substituting, by the determination module, the coordinates of the first keypoint and the coordinates of the second keypoint into the two-variable linear function to obtain first and second values, respectively, and determining the state of the face based on the first and second values.

9. The detection method according to claim 8, wherein the above step (d) comprises:

(d1) determining the face as a side face state by the determination module responding to the product of the first and second values as a positive number; and determining the face as a front face state by the determination module responding to the product of the first and second values as a negative number.

10. The detection method according to claim 8, wherein the above step (b) comprises:

(b1) subtracting, by the first calculation module, the coordinates of the first keypoint from the coordinates of the second keypoint to obtain the vector.

11. The detection method according to claim 8, wherein the above step (c) comprises the following steps executed by the second calculation module:

(c1) setting a first component of the vector as a coefficient of a first variable of an intermediate two-variable linear equation, and setting a second component of the vector as a coefficient of a second variable of the intermediate two-variable linear equation;

(c2) substituting a first coordinate component and a second coordinate component of the third keypoint into the intermediate two-variable linear equation to obtain a constant term of the intermediate two-variable linear equation; and (c3) setting the first component of the vector as a coefficient of a first variable of the two-variable linear function, setting the second component of the vector as a coefficient of a second variable of the two-variable linear function, and setting the constant term of the intermediate two-variable linear equation as a constant term of the two-variable linear function.

12. The detection method according to claim 8, wherein the predetermined position on the midline of the human face is the position of the nose.

13. The detection method according to claim 8, wherein the two predetermined positions paired outside the midline of the human face are the positions of the eyes.

14. The detection method according to claim 8, wherein the keypoint acquisition module comprises a neural network module, the neural network module being configured to receive the image of the face and output the coordinates of the first keypoint, the coordinates of the second keypoint and the coordinates of the third keypoint.

\* \* \* \* \*